United States Patent
Liu et al.

(10) Patent No.: US 7,117,843 B2
(45) Date of Patent: Oct. 10, 2006

(54) EMISSION REDUCTION IN A DIESEL ENGINE USING AN ALTERNATIVE COMBUSTION PROCESS AND A LOW-PRESSURE EGR LOOP

(75) Inventors: Zhengbai Liu, Naperville, IL (US); Puning Wei, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/960,664

(22) Filed: Oct. 7, 2004

(65) Prior Publication Data

US 2006/0075995 A1    Apr. 13, 2006

(51) Int. Cl.
- *F02B 3/12* (2006.01)
- *F02B 47/08* (2006.01)
- *F02B 33/44* (2006.01)
- *F02M 25/07* (2006.01)
- *F01N 3/00* (2006.01)

(52) U.S. Cl. ............... 123/299; 123/568.12; 60/605.2

(58) Field of Classification Search ............... 123/295, 123/299, 300, 568.12, 568.14, 568.21; 60/274, 60/276, 278, 279, 280, 285, 605.2
See application file for complete search history.

(56) References Cited

U.S. PATENT DOCUMENTS

| | | | |
|---|---|---|---|
| 6,173,571 B1 * | 1/2001 | Kaneko et al. | 123/300 |
| 6,301,887 B1 | 10/2001 | Gorel et al. | |
| 6,725,829 B1 * | 4/2004 | Kataoka et al. | 123/568.21 |
| 6,857,263 B1 * | 2/2005 | Gray et al. | 60/605.2 |
| 2004/0221831 A1 * | 11/2004 | Chmela et al. | 123/301 |
| 2005/0172613 A1 * | 8/2005 | Blomquist | 60/605.2 |

FOREIGN PATENT DOCUMENTS

JP       2000179326 A  *  6/2000   ............... 60/605.2

* cited by examiner

*Primary Examiner*—Willis R. Wolfe, Jr.
(74) *Attorney, Agent, or Firm*—Dennis K. Sullivan; Susan L. Lukasik; Jeffrey P. Calfa

(57) ABSTRACT

A compression ignition engine (20) has a control system (26) for processing data, one or more combustion chambers (22), and fuel injectors (24) for injecting fuel into the combustion chambers. The control system controls fueling using a result of the processing of certain data, such as engine speed and engine load.

18 Claims, 1 Drawing Sheet

EMISSION REDUCTION IN A DIESEL ENGINE USING AN ALTERNATIVE COMBUSTION PROCESS AND A LOW-PRESSURE EGR LOOP

FIELD OF THE INVENTION

This invention relates generally to internal combustion engines, especially compression ignition (i.e. diesel) engines that operate by alternative combustion processes. More specifically, the invention relates to a strategy for reducing tailpipe emissions from such engines through the use of a low-pressure EGR (exhaust gas recirculation) loop in conjunction with a two-stage fueling process where some fueling occurs before top dead center (TDC) and additional fueling occurs after TDC.

BACKGROUND OF THE INVENTION

HCCI (homogeneous charge compression ignition) is a recognized process for fueling a diesel engine in a manner that creates a substantially homogeneous air-fuel charge inside an engine cylinder during a compression upstroke of an engine cycle. After a desired quantity of fuel for the charge has been injected into the cylinder to create a generally homogeneous air-fuel mixture, the increasing compression of the charge by the upstroking piston creates sufficiently large pressure to cause auto-ignition of the charge near or at TDC. Auto-ignition may occur as the substantially simultaneous spontaneous combustion of vaporized fuel at various locations within the mixture.

One of the attributes of HCCI is that relatively lean, or dilute, mixtures can be combusted, keeping the combustion temperatures relatively low. By avoiding the creation of relatively higher combustion temperatures, HCCI can yield significant reductions in the generation of $NO_X$, an undesired constituent of engine exhaust gas.

Another attribute of HCCI is that auto-ignition of a substantially homogeneous air-fuel charge generates more complete combustion and consequently relatively less soot in engine exhaust.

The potential benefit of HCCI on reducing tailpipe emissions is therefore rather significant, and consequently HCCI is a subject of active investigation and development by many scientists and engineers in the engine research and design community.

HCCI may be considered one of several alternative combustion processes for a compression ignition engine. Other processes that may be considered alternative combustion processes include Controlled Auto-Ignition (CAI), Dilution Controlled Combustion Systems (DCCS), and Highly Premixed Combustion Systems (HPCS).

By whatever name an alternative combustion system or process may be called, a common attribute is that fuel is introduced into a cylinder in some manner well before TDC to form an air-fuel charge that is increasingly compressed until auto-ignition occurs near or at TDC.

If such alternative processes are not suitable over the full range of engine operation for any particular engine, the engine may be fueled in the traditional conventional diesel manner where charge air is compressed to the point where it causes the immediate ignition of fuel upon fuel being injected into a cylinder, typically very near or at top dead center where the air has been compressed to a maximum.

With the availability of processor-controlled fuel injection systems capable of controlling fuel injection with precision that allows fuel to be injected at different injection pressures, at different times, and for different durations during an engine cycle over the full range of engine operation, a diesel engine becomes capable of operating by alternative combustion processes and/or traditional diesel combustion.

Because a diesel engine that powers a motor vehicle runs at different speeds and loads depending on various inputs to both the vehicle and the engine that influence engine operation, fueling requirements change as speed and load change. An associated processing system processes data indicative of parameters such as engine speed and engine load to develop control data for setting desired engine fueling for particular operating conditions that will assure proper control of the fuel injection system for various combinations of engine speed and engine load.

SUMMARY OF THE INVENTION

Briefly, the present invention relates to a diesel engine operating by an alternative diesel combustion process, and to a system and method in such engine, for reducing tailpipe emissions, particularly NOx and DPM (diesel particulate matter, or soot), through the use of a low-pressure EGR loop in conjunction with a two-stage fueling process where a first stage of fueling occurs before TDC and a second stage occurs after TDC. The pre-TDC first stage fueling is performed according to an alternative diesel combustion strategy where fuel is introduced to create a fuel-air mixture that is compressed to auto-ignition at or near TDC. The postTDC second stage fueling serves to combust certain products of combustion resulting from the autoignition of the mixture that was created by the first stage fueling.

Relatively larger amounts of low-pressure exhaust gas are recirculated from the tailpipe to the engine intake system. Because the constituency of the recirculated exhaust gas has greater mass than that of the charge air with which it entrains, the mass flow into the engine will be increased to some extent even if only a modest one. But the mass increase can help in limiting combustion temperature to some extent. In other words, even if the added mass increases the total mass flow into the engine by only a small percentage, it can have some effect on limiting combustion temperature, and hence a benefit in reducing the in-cylinder generation of NOx.

The strategy for the invention can be embodied in the engine control system as a programmed algorithm that is repeatedly executed by a processor.

One generic aspect of the present invention relates to a method of operating a turbocharged compression ignition engine during an engine cycle. The method comprises creating in an engine cylinder before TDC, a charge comprising recirculated engine exhaust gas obtained from an exhaust system of the engine downstream of a turbine of a turbocharger of the engine. The charge further comprises charge air drawn through an intake system of the engine and diesel fuel.

The charge is compressed to auto-ignition at or near TDC. After TDC, and before combustion of the auto-ignited charge has concluded, additional fuel is introduced into the cylinder to continue combustion.

Another generic aspect of the invention relates to a turbocharged compression ignition engine that has engine cylinders within which combustion occurs to run the engine, an intake system through which charge air is introduced into the cylinders, and an exhaust system through which products of combustion from the engine cylinders are exhausted. A turbocharger whose turbine is in the exhaust system and compressor is in the intake system turbocharges the engine.

A fueling system fuels the cylinders. An exhaust gas recirculation circuit conveys exhaust gas from a location in the exhaust system downstream of the turbine to a location in the intake system upstream of the compressor.

A processor-based engine control system controls the engine, including the fueling system, to create in the engine cylinders during engine cycles before TDC, charges comprising recirculated engine exhaust gas from the exhaust gas recirculation circuit, charge air drawn into the intake system by the compressor, and fuel. Those constituents form charges that are compressed to auto-ignition at or near TDC. After TDC but before combustion of the auto-ignited charges has concluded, additional fuel is introduced into the cylinders to continue combustion.

Certain data that is processed for controlling creation of the charges and the additional fuel comprises engine speed data and engine load data.

The invention also relates to a system for tailpipe emission control in a turbocharged compression ignition engine. The system comprises a charge-formation capability, an auto-ignition capability, and a post-TDC extension-of-combustion capability.

The charge-formation capability creates in the engine cylinders during engine cycles before TDC, charges comprising recirculated engine exhaust gas provided by a low-pressure exhaust gas recirculation loop that is between atmosphere and a turbocharger that turbocharges the engine, charge air drawn into the engine by the turbocharger, and fuel that is injected into the cylinders.

The auto-ignition capability causes auto-ignition of the charges at or near TDC.

The post-TDC extension-of-combustion capability is effective after TDC but before combustion of the auto-ignited charges has concluded, to cause additional fuel to be introduced into the cylinders to extend combustion.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
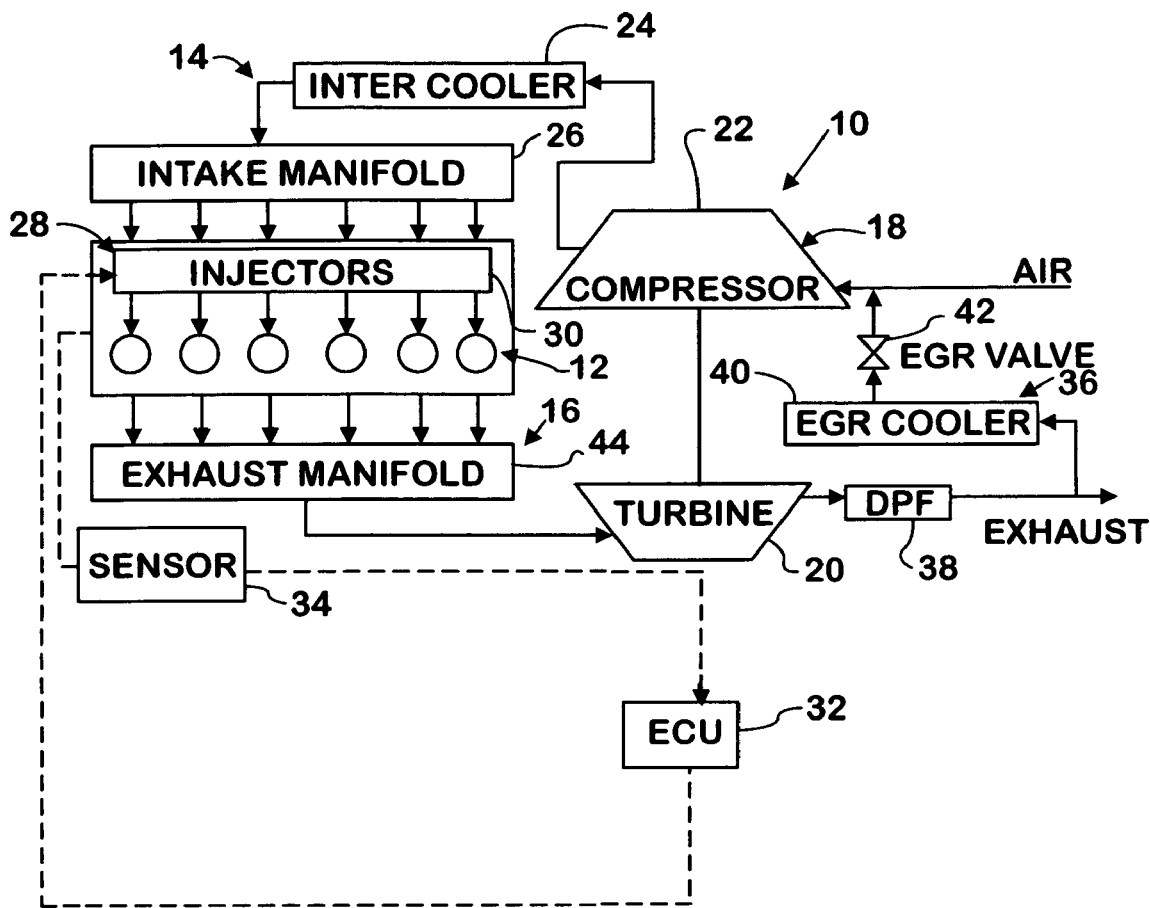
FIG. 1 is a general schematic diagram of those portions of an exemplary diesel engine relevant to principles of the present invention.

FIG. 1 shows schematically a portion of an exemplary turbocharged diesel engine 10 operating in accordance with the inventive strategy for powering a motor vehicle. Engine 10 comprises cylinders 12 within which pistons reciprocate. Each piston is coupled to a respective throw of a crankshaft by a corresponding connecting rod. Engine 10 further comprises an intake system 14 and an exhaust system 16. Turbocharging is provided by a turbocharger 18 having a turbine 20 in exhaust system 16 that operates a compressor 22 in intake system 14.

Intake system 14 further comprises an intercooler 24 downstream of compressor 22 for cooling charge air that has been drawn into intake system 14 and compressed by compressor 22. From intercooler 24 the charge air is introduced into an engine intake manifold 26 that serves cylinders 12. Charge air enters each cylinder when a respective intake valve is open during the engine cycle.

Engine 10 further comprises a fueling system 28 that comprises fuel injectors 30 for cylinders 12. The engine also has a processor-based engine control system or unit (ECU) 32 that processes data from various sources to develop various control data for controlling various aspects of engine operation. The data processed by ECU 32 may originate at external sources, such as various sensors 34, and/or be generated internally. Examples of data processed may include engine speed, intake manifold pressure, exhaust manifold pressure, fuel injection pressure, fueling quantity and timing, mass airflow, and accelerator pedal position, but any particular algorithm that processes data in practice of the invention may not necessarily process data for all of these enumerated parameters. Typically however, engine speed data and a parameter or parameters that are indicative of engine load are processed.

Engine 10 further comprises an EGR circuit, or loop, 36 between exhaust system 16 and intake system 14. This circuit provides low-pressure EGR because circuit 36 begins downstream of turbine 20. In this embodiment a DPF (diesel particulate filter) 38 is disposed in the exhaust system downstream of turbine 20 so the exhaust gas that is recirculated through circuit 36 is exhaust gas that has been treated by DPF 38.

Circuit 36 comprises an EGR cooler 40 through which recirculated exhaust gas passes after having entered circuit 36. The recirculation of cooled gas to intake system 14 is controlled by an EGR valve 42 that is itself under the control of ECU 32. Cooled recirculated exhaust gas that is allowed to pass through valve 42 enters intake system 14 upstream of compressor 22.

ECU 32 controls engine fueling by controlling the operation of the fueling system 28, including controlling the operation of fuel injectors 30. The processing system embodied in ECU 32 can process data sufficiently fast to calculate, in real time, the timing and duration of device actuation to set both the timing and the amount of each injection of fuel into a cylinder. Such control capability is used in practice of the present invention for implementing a fuel control strategy that provides the low temperature combustion (cool flame) that characterizes alternative diesel combustion processes. The fuel control strategy fuels a cylinder during a first stage of fueling before TDC and again during a second stage of fueling after TDC but before combustion resulting from auto-ignition of the first stage fueling has concluded. In conjunction with the low-pressure EGR loop, this strategy is believed useful for achieving compliance with certain requirements for reduced NOx (Nitrogen Oxides) and DPM (Particulate Matter) in tailpipe emissions from motor vehicles powered by diesel engines.

When engine 10 runs, compressor 22 draws fresh air and low-pressure recirculated exhaust gas into intake system 14 and forces the boosted flow through intercooler 24, where heat is extracted to reduce temperature, and into intake manifold 26. The charge air, with some entrained exhaust gas, enters each engine cylinder 12 when a respective intake valve opens.

Diesel fuel is injected into each cylinder 12 in accordance with control provided by ECU 32 to perform the first stage fueling. The injected fuel vaporizes and mixes with the charge air in each cylinder. The timing of injection occurs well in advance of TDC to provide quality mixing of air and fuel. The mixture of air, fuel, and some recirculated exhaust gas is then increasingly compressed to auto-ignition at or near TDC. It is considered good practice to terminate the introduction of the first stage fuel into the cylinders at least 10° before TDC. The fuel burns, increasing the gas pressure in the cylinder, pushing the piston down during the ensuing power stroke, to deliver torque to the engine crankshaft.

After the power stroke, an exhaust valve for the cylinder opens and the exhaust gas resulting from combustion enters an exhaust manifold 44 that channels the exhaust gas to the inlet of turbine 20. The hot, high-pressure exhaust gas drives the turbocharger, with the outflow from the turbine then processed by DPF 38. Part of the treated exhaust gas enters EGR circuit 36 with the remainder passing to atmosphere.

The fuel injection occurs in two stages. The first fuel injection stage (FIS1 in FIG. 2) is controlled to start and end well in advance of TDC for more complete premixing of the air-fuel mixture before auto-ignition begins at or near TDC. The combustion of a well-premixed air-fuel mixture gives off very low particulate emissions like gasoline engines. A relatively large amount of exhaust gas available from low pressure EGR loop 36 increases the heat capacity of the charges in the cylinders, resulting in lower temperature combustion that tends to generate very low NOx emissions. As a result, very low DPM emissions and very low NOx emissions result from the first stage combustion.

The second fuel injection stage (FIS2 in FIG. 2) starts after TDC when the first stage combustion is close to finishing. Owing to the acceleration of the downstroking piston and the high EGR rate in a cylinder when the second stage combustion starts, the temperature in the cylinder can be lower than in conventional diesel combustion, resulting in low NOx emissions. The second stage combustion also helps reduce particulate emissions, and in addition, can burn out much of HC and CO that may result from incomplete first stage combustion because of the very early fuel injection, occurring in a range of substantially 40°–150° crank angle before TDC for the first stage fuel injection start.

Figure 2:
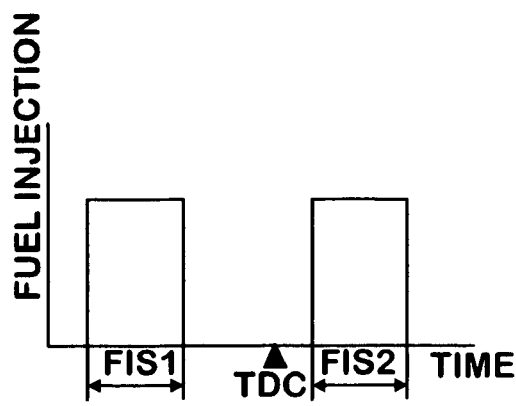
FIG. 2 is a representative graphic portrayal of fueling in accordance with the invention.

The present invention can be effective over the whole range of engine operating conditions. A whole group of fuel injection maps are developed from engine tests and stored in memory of ECU 32. In general, a corresponding fuel injection map from the ECU is executed for a given engine speed and engine load. FIG. 2 is representative of a generic map. Furthermore, each fuel injection stage could have multiple fuel injection events, each having its own injection timing and duration. However, it should be pointed out that at some occasional extreme conditions, either of the two fuel injection stages could have a zero fuel injection event, resulting in only single stage combustion, but with low temperature combustion still being maintained.

The present invention can be used for heavy-duty, medium-duty, and light-duty diesel engines, and provides high thermal efficiency.

While a presently preferred embodiment of the invention has been illustrated and described, it should be appreciated that principles of the invention apply to all embodiments falling within the scope of the following claims.

What is claimed is:

1. A method of operating a turbocharged compression ignition engine during an engine cycle, the method comprising:
   creating in an engine cylinder before TDC, a charge comprising recirculated engine exhaust gas obtained from an exhaust system of the engine downstream of a turbine of a turbocharger of the engine, charge air, and fuel;
   compressing the charge to auto-ignition at or near TDC; and
   after TDC and before combustion of the auto-ignited charge has concluded, introducing additional fuel into the cylinder to continue combustion.

2. A method as set forth in claim 1 wherein the step of creating the charge comprises terminating the introduction of the first stage fuel into the cylinder at least 10° before TDC.

3. A method as set forth in claim 1 wherein the step of creating the charge comprises processing engine speed data and engine load data according to one or more maps containing data values for charge data correlated with data values for engine speed data and data values for engine load data.

4. A method as set forth in claim 1 wherein the step of introducing additional fuel into the cylinder to continue combustion comprises processing engine speed data and engine load data according to one or more maps containing data values for additional fuel data correlated with data values for engine speed data and data values for engine load data.

5. A method as set forth in claim 1 wherein the recirculated engine exhaust gas obtained from an exhaust system of the engine downstream of a turbine of a turbocharger is introduced into an intake system of the engine upstream of a compressor of the turbocharger.

6. A method as set forth in claim 5 wherein the recirculated engine exhaust gas is obtained downstream of an exhaust gas treatment device in the exhaust system downstream of the turbine.

7. A method as set forth in claim 5 wherein the recirculated engine exhaust gas is obtained downstream of a diesel particulate filter in the exhaust system downstream of the turbine.

8. A method as set forth in claim 7 wherein the recirculated engine exhaust gas is caused to pass from downstream of the diesel particulate filter through a cooler that cools the recirculated exhaust gas and then through an EGR valve that is controlled by an engine control system of the engine.

9. A turbocharged compression ignition engine comprising:
   engine cylinders within which combustion occurs to run the engine;
   an intake system through which charge air is introduced into the cylinders;
   an exhaust system through which products of combustion from the engine cylinders are exhausted;
   a turbocharger having a turbine in the exhaust system and a compressor in the intake system;
   a fueling system for fueling the cylinders;
   an exhaust gas recirculation circuit for conveying exhaust gas from a location in the exhaust system downstream of the turbine to a location in the intake system upstream of the compressor; and
   a processor-based engine control system for controlling the engine, including the fueling system, to create in the engine cylinders during engine cycles before TDC, charges comprising recirculated engine exhaust gas from the exhaust gas recirculation circuit, charge air drawn into the intake system by the compressor, and fuel that are compressed to auto-ignition at or near TDC, and after TDC before combustion of the auto-ignited charges has concluded, to cause additional fuel to be introduced into the cylinders to continue combustion.

10. An engine as set forth in claim 9 wherein the engine control system causes the fueling system to terminate the introduction of the first stage fuel into the cylinders at least 10° before TDC.

11. An engine as set forth in claim 9 wherein the engine control system comprises one or more maps containing data values for charge data correlated with data values for engine speed data and data values for engine load data, and controls creation of the charges by processing engine speed data and engine load data according to the maps.

12. An engine as set forth in claim 9 wherein the engine control system comprises one or more maps containing data values for additional fuel correlated with data values for engine speed data and data values for engine load data, and controls the introduction of additional fuel into the cylinders to continue combustion by processing engine speed data and engine load data according to the maps.

13. An engine as set forth in claim 9 wherein the exhaust gas recirculation circuit has a beginning downstream of an exhaust gas treatment device in the exhaust system downstream of the turbine.

14. An engine as set forth in claim 13 wherein the exhaust gas treatment device comprises a diesel particulate filter.

15. An engine as set forth in claim 14 wherein the exhaust gas recirculation circuit comprises a cooler that cools the recirculated exhaust gas followed by an EGR valve that is controlled by the engine control system.

16. A system for tailpipe emission control in a turbocharged compression ignition engine, the system comprising:

a charge-formation capability for creating in the engine cylinders during engine cycles before TDC, charges comprising recirculated engine exhaust gas provided by a low-pressure exhaust gas recirculation loop that is associated with the engine between atmosphere and a turbocharger that turbocharges the engine, charge air drawn into the engine by the turbocharger, and fuel that is injected into the cylinders;

an auto-ignition capability for causing auto-ignition of the charges at or near TDC; and a post-TDC extension-of-combustion capability that after TDC but before combustion of the auto-ignited charges has concluded, causes additional fuel to be introduced into the cylinders to extend combustion.

17. A system as set forth in claim 16 comprising one or more maps containing data values for charge data correlated with data values for engine speed data and data values for engine load data for controlling creation of the charges by processing engine speed data and engine load data according to the maps.

18. A system as set forth in claim 17 comprising one or more additional maps containing data values for additional fuel correlated with data values for engine speed data and data values for engine load data for controlling the introduction of additional fuel into the cylinders to continue combustion by processing engine speed data and engine load data according to the additional maps.

* * * * *